UNITED STATES PATENT OFFICE.

ELIZABETH S. YARNALL, OF ST. LOUIS, MISSOURI, ADMINISTRATRIX OF ZACHARIAH S. YARNALL, DECEASED.

EFFERVESCENT LAUNDRY BLUING.

No. 846,887.  Specification of Letters Patent.  Patented March 12, 1907.

Application filed January 7, 1904. Serial No. 188,106.

*To all whom it may concern:*

Be it known that ZACHARIAH S. YARNALL, deceased, late of the United States, residing in the city of St. Louis, in the State of Missouri, did invent a certain new and useful Improvement in Effervescent Laundry Bluing, of which the following is a full, clear, and exact description.

The invention relates to a laundry bluing preferably made in the form of tablets, the object of the invention being to furnish a coloring substance in condensed form that will be effervescent when placed in water, whereby the coloring-matter will be fully and quickly diffused and disseminated to distribute evenly throughout the body of water in which it is placed without the necessity of mechanical agitation.

The invention consists in features of novelty hereinafter fully described, and pointed out in the claims.

In producing the tablets a base is utilized consisting of soluble blue (preferably what is known commercially as "Tiemann's blue") and oxalic acid and bicarbonate of soda, which in combination with each other and in the presence of water serve to produce a gas by which the effervescing quality of the tablets is secured. The above-named ingredients constitute the main or fundamental agents of the bluing. To said agents is added wood-alcohol as a granulating agent, mucilage of acacia as a binding agent, petrolene-oil as a lubricant, and boric acid as a non-adhering agent to prevent adhesion of the tablets in the process of pressing them into shape.

Without limiting the invention to any particular proportions of the ingredients entering into the bluing in its manufacture, such proportions are set forth as have been found to furnish satisfactory results, which are as follows: fifteen and one-half pounds of soluble blue, four and one-half pounds oxalic acid, four and one-half pounds bicarbonate of soda. These three ingredients are mixed into a mass by adding thereto sufficient wood-alcohol and mucilage of acacia to render the mass paste-like and of a consistency that will permit of all of the ingredients being thoroughly intermingled with each other. In thus preparing the mass granulation is produced, due to the presence of the wood-alcohol therein, and it is rendered adhesive, due to the presence of the mucilage of acacia or binding agent. To the mass is then added a small quantity of petrolene-oil, that serves as a lubricant.

After the mass herein described has been thoroughly mixed in the manner set forth it is passed through a suitable sieve, preferably one having twelve mesh to the inch, to produce granulation of the mass, and in its granular form it is then placed in a suitable drying-oven to be dried. After the granulated mass has been thoroughly dried a small quantity of petrolene-oil is added to it, which serves to lubricate it, and a small quantity of boric acid, which by adhering to the lubricant prevents sticking of the particles of the mass to the molds used in forming the tablets. The completed mass is then pressed in suitable molds forming the tablets, each tablet being preferably produced of a weight of six grains, although they may be of any other desirable size.

It is apparent that the proportions of the ingredients herein described constituting the various agents used in the bluing may be varied more or less without departing from my invention in order to produce a stronger or weaker coloring-matter and one in which the effervescent quality will be enhanced or diminished according to the desire of the producer, and therefore the invention is not restricted to the particular proportions named in view of the wide range that is possible in gaining any particular result in the use of the compound.

I claim as my invention—

1. As a new article of manufacture, a bluing tablet consisting of a soluble blue-base, effervescing agents, and wood-alcohol as a granulating agent, substantially as described.

2. As a new article of manufacture, a bluing tablet consisting of soluble blue, oxalic acid, bicarbonate of soda, wood-alcohol, and mucilage of acacia, substantially as described.

3. As a new article of manufacture, a bluing tablet consisting of soluble blue, oxalic acid, bicarbonate of soda, wood-alcohol, mucilage of acacia, petrolene-oil, and boric acid, substantially as described.

ELIZABETH S. YARNALL,
*Administratrix of the estate of Zachariah S. Yarnall.*

In presence of—
E. S. KNIGHT,
BLANCHE HOGAN.